(12) United States Patent
Luo et al.

(10) Patent No.: US 12,640,661 B2
(45) Date of Patent: May 26, 2026

(54) SYSTEM AND METHOD FOR MUTUAL INDUCTANCE CANCELLATION FOR TWO-LEVEL CONVERTERS

(71) Applicant: GM GLOBAL TECHNOLOGY OPERATIONS LLC, Detroit, MI (US)

(72) Inventors: Yilun Luo, Ann Arbor, MI (US); Chandra S. Namuduri, Troy, MI (US); Rashmi Prasad, Troy, MI (US); Khorshed Mohammed Alam, Canton, MI (US); Junghoon Kim, Carlisle, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 18/618,086

(22) Filed: Mar. 27, 2024

(65) Prior Publication Data

US 2025/0309779 A1     Oct. 2, 2025

(51) Int. Cl.
| | |
|---|---|
| *H02M 7/00* | (2006.01) |
| *H02M 1/00* | (2006.01) |
| *H02M 7/537* | (2006.01) |
| *H02M 1/32* | (2007.01) |

(52) U.S. Cl.
CPC ........... *H02M 7/003* (2013.01); *H02M 1/007* (2021.05); *H02M 7/537* (2013.01); *H02M 1/32* (2013.01)

(58) Field of Classification Search
CPC ...... H02M 7/003; H02M 1/007; H02M 7/537; H02M 1/32
See application file for complete search history.

(56) References Cited

U.S. PATENT DOCUMENTS

| | | | | | |
|---|---|---|---|---|---|
| 10,099,574 | B2 * | 10/2018 | Lei | ..................... | H01L 23/49524 |
| 10,103,641 | B2 * | 10/2018 | Masuzawa | .............. | H02M 7/48 |
| 12,172,548 | B2 * | 12/2024 | Ling | ........................ | B60L 58/25 |
| 2006/0152085 | A1 * | 7/2006 | Flett | ...................... | H02M 7/487 |
| | | | | | 307/75 |
| 2006/0274561 | A1 * | 12/2006 | Ahmed | ............. | H02M 7/53871 |
| | | | | | 361/699 |
| 2016/0043659 | A1 * | 2/2016 | Xu | ......................... | H02M 1/088 |
| | | | | | 363/131 |

(Continued)

FOREIGN PATENT DOCUMENTS

| | | | |
|---|---|---|---|
| DE | 102016106878 | A1 | 10/2016 |
| DE | 102016122772 | A1 | 6/2017 |

(Continued)

*Primary Examiner* — Rafael O De Leon Domenech
(74) *Attorney, Agent, or Firm* — Quinn IP Law

(57) ABSTRACT

A two-level power converter assembly includes a positive bus having a positive DC power bus, at least one high side semiconductor switch, and an AC bus high side output from the at least one high side semiconductor switch. The assembly also includes a negative bus having a negative DC power bus, at least one low side semiconductor switch, and an AC bus low side output from the at least one low side semiconductor switch. The positive bus is laterally offset and overlapping with the negative bus and the at least one high side semiconductor switch is connected in series with the at least one low side semiconductor switch between the positive bus and the negative bus. A first node connects the AC bus high side output to the AC bus low side output and the first node includes a first AC phase leg output.

20 Claims, 9 Drawing Sheets

(56) References Cited

U.S. PATENT DOCUMENTS

| | | | | |
|---|---|---|---|---|
| 2016/0141962 A1* | 5/2016 | Outram | ............ | H02M 3/33507 363/21.01 |
| 2017/0353137 A1* | 12/2017 | Pan | ........................... | H02P 5/00 |
| 2018/0097452 A1* | 4/2018 | Chapman | ............. | H02M 7/493 |
| 2018/0248493 A1* | 8/2018 | Mihalache | ........... | H02M 7/483 |
| 2018/0288907 A1* | 10/2018 | Richards | ............... | H01L 23/467 |
| 2019/0061537 A1* | 2/2019 | Ge | ........................... | H02K 3/28 |
| 2019/0348924 A1* | 11/2019 | Kumar | .................. | H02H 1/043 |
| 2020/0053900 A1* | 2/2020 | Feurtado | ............. | H05K 1/0271 |
| 2021/0234475 A1* | 7/2021 | Banerjee | ............ | H02M 1/0095 |
| 2021/0297009 A1* | 9/2021 | Liu | .................. | H02M 3/33507 |
| 2022/0304185 A1* | 9/2022 | Nishimachi | ........... | H05K 7/209 |
| 2023/0238895 A1* | 7/2023 | Moon | ................. | H02M 7/487 363/40 |

FOREIGN PATENT DOCUMENTS

| | | | |
|---|---|---|---|
| DE | 102023104213 A1 | 6/2024 | |
| JP | 2004364427 A | 12/2004 | |
| JP | 2007215396 A | 8/2007 | |

* cited by examiner

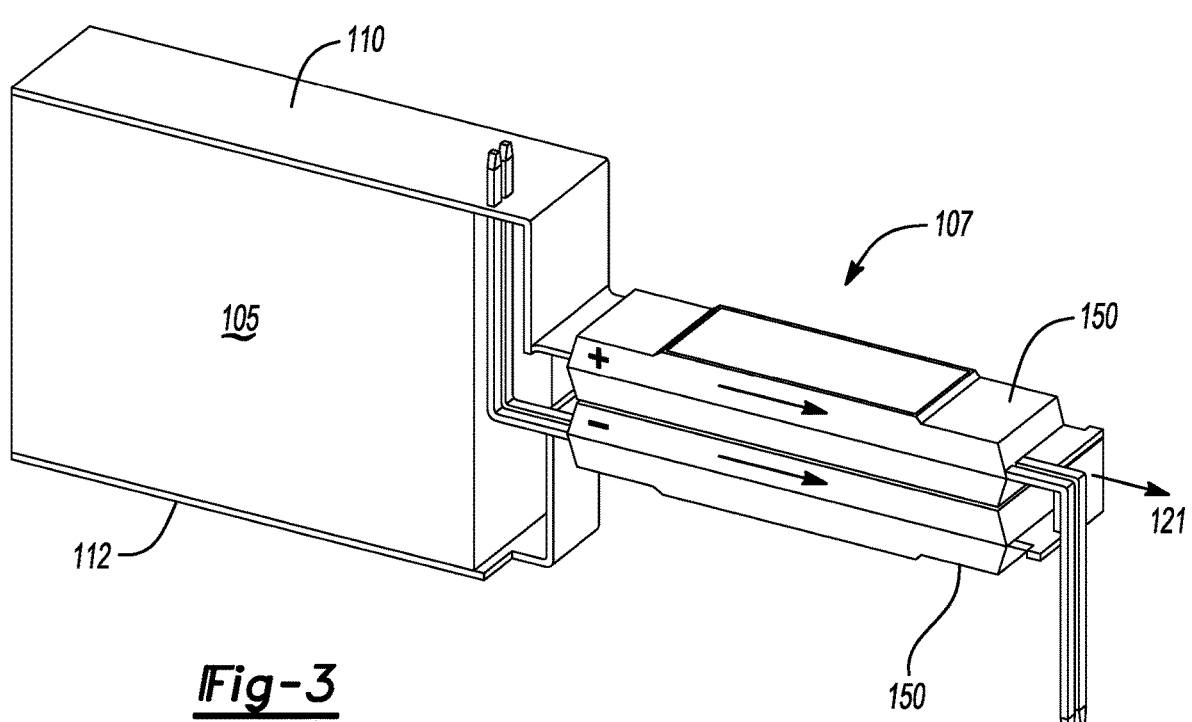
_Fig-3_
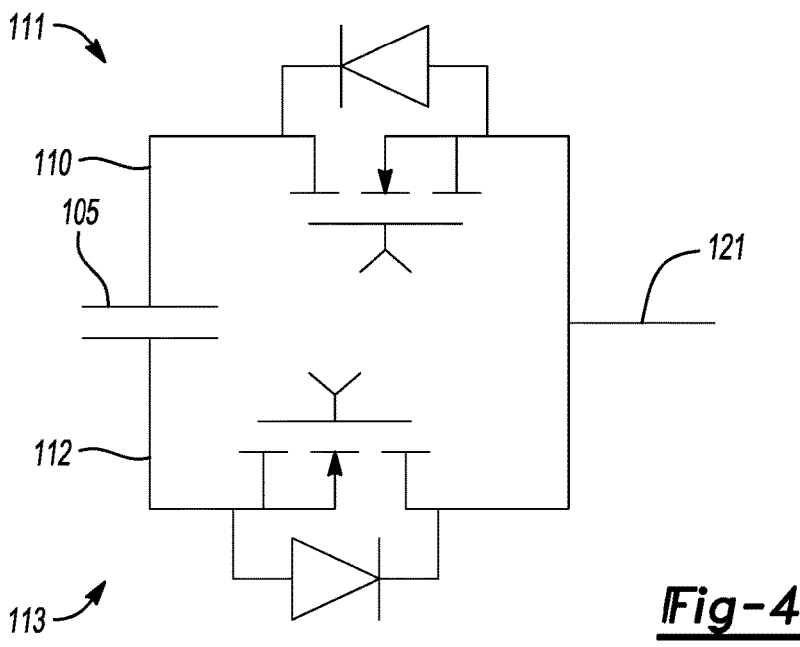
_Fig-4_

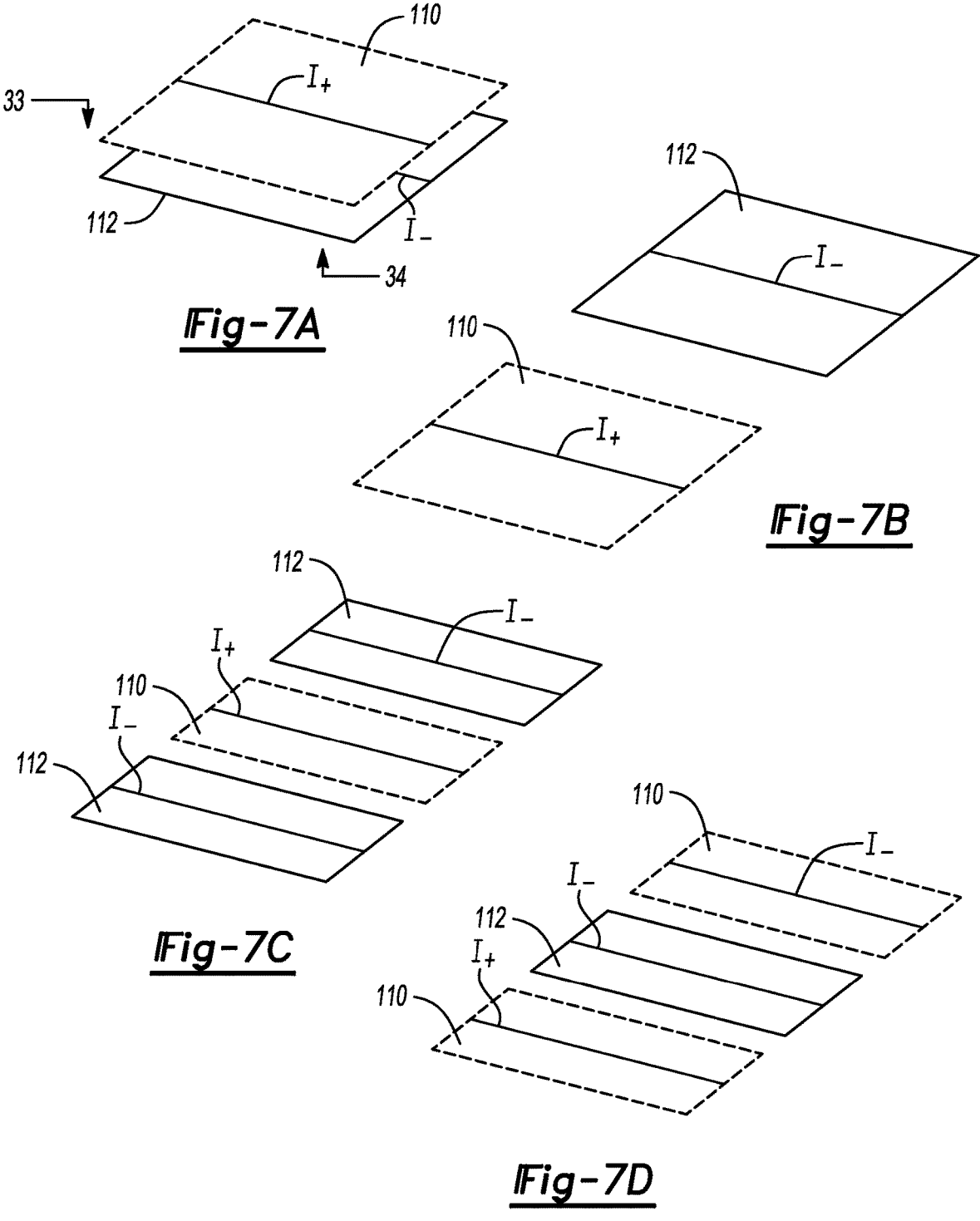
_Fig-7A_
_Fig-7B_
_Fig-7C_
_Fig-7D_

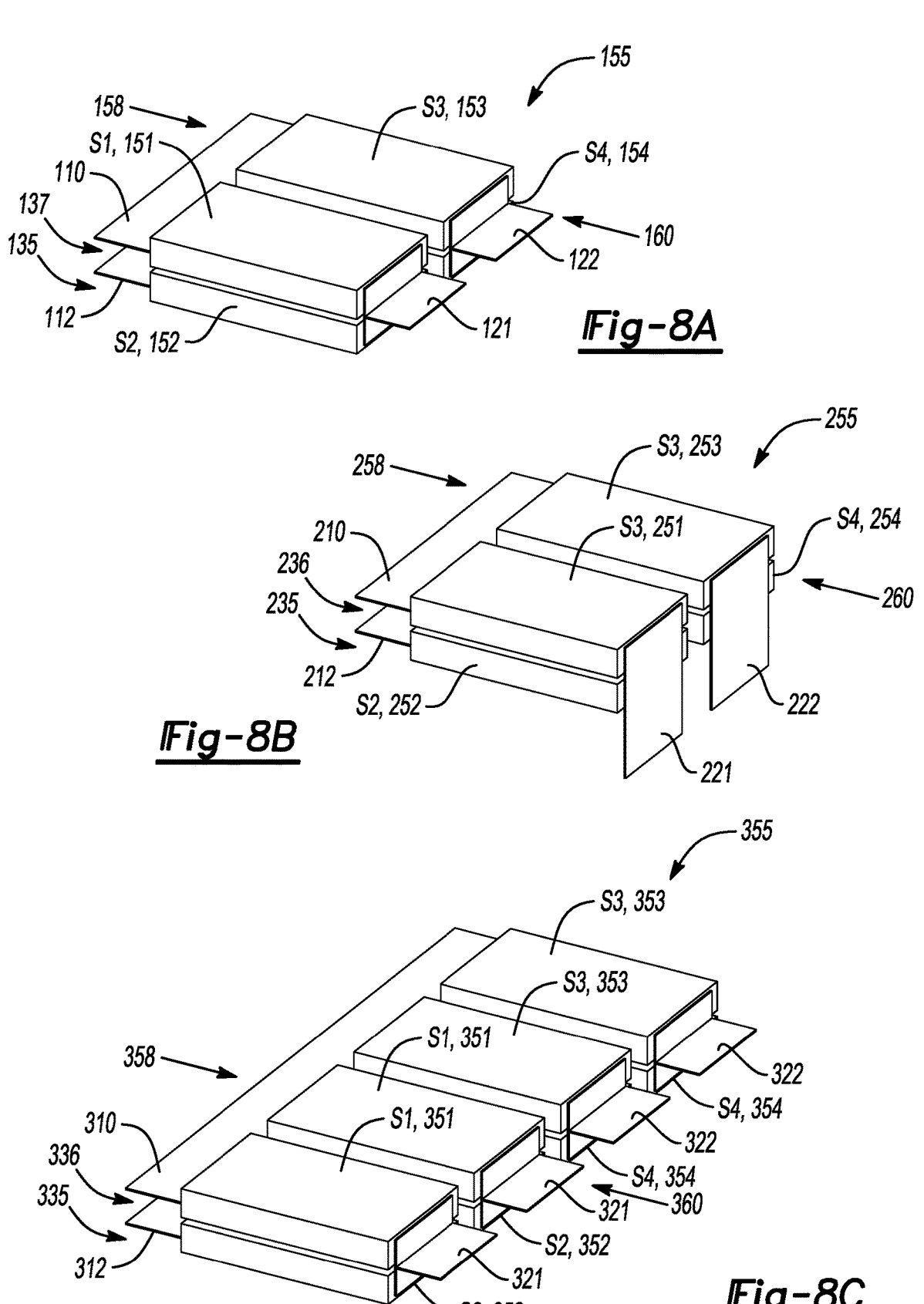
_Fig-8A_
_Fig-8B_
_Fig-8C_

SYSTEM AND METHOD FOR MUTUAL INDUCTANCE CANCELLATION FOR TWO-LEVEL CONVERTERS

INTRODUCTION

The concepts described herein relate generally to vehicles employing electrified powertrain or propulsion systems, which are composed with direct current (DC) power supplies providing electric power to multi-phase power inverters to control operation of one or multiple electric machines.

High-voltage and high-power two-level inverters (TLIs) have gained attention as the transportation electrification trend is rapidly expanding towards high-capacity mass transit systems such as electric aircraft, trains, and ships. As multi-phase power inverters operate at higher switching frequencies, even small levels of parasitic inductance may lead to issues, for example, but not limited to, ringing and/or electromagnetic interference (EMI).

SUMMARY

Disclosed herein is a two-level power converter assembly. The assembly includes a positive bus having a positive DC power bus, at least one high side semiconductor switch, and an AC bus high side output from the at least one high side semiconductor switch. The assembly also includes a negative bus having a negative DC power bus, at least one low side semiconductor switch, and an AC bus low side output from the at least one low side semiconductor switch. The positive bus is laterally offset and overlapping with the negative bus and the at least one high side semiconductor switch is connected in series with the at least one low side semiconductor switch between the positive bus and the negative bus. A first node connects the AC bus high side output to the AC bus low side output and the first node includes a first AC phase leg output.

Another aspect of the disclosure may be where the positive bus and the negative bus are arranged in a coplanar configuration.

Another aspect of the disclosure may be where the positive bus and the negative bus are arranged in a stacked configuration.

Another aspect of the disclosure may include a second positive bus coplanar with the positive bus and the negative bus and separated from the positive bus by the negative bus.

Another aspect of the disclosure may include a second negative bus coplanar with the positive bus and the negative bus and separated from the negative bus by the positive bus.

Another aspect of the disclosure may be where the positive DC power bus and the at least one high side semiconductor switch are arranged linearly and the negative DC power bus and the at least one low side semiconductor switch are arranged linearly and parallel to the positive DC power bus and the at least one high side semiconductor.

Another aspect of the disclosure may be where the at least one high side semiconductor switch includes a first high side semiconductor switch and a second high side semiconductor switch. The at least one low side semiconductor switch includes a first low side semiconductor switch and a second low side semiconductor switch. The first high side semiconductor switch is connected to the first low side semiconductor switch at the first node with the first high side semiconductor switch and the first low side semiconductor switch connected in series between the positive bus and the negative bus. The second high side semiconductor switch is connected to the second low side semiconductor switch at a second node with the second high side semiconductor switch and the second low side semiconductor switch connected in series between the positive bus and the negative bus.

Another aspect of the disclosure may be where the second node includes a second AC phase leg output.

Another aspect of the disclosure may be where the positive bus and the negative bus are arranged in a stacked configuration with the first high side semiconductor switch and the second high side semiconductor switch are arranged in a first tier and the second high side semiconductor switch and the second low side semiconductor switch are located in a second tier.

Another aspect of the disclosure may be where the positive DC power bus and the negative DC power bus are arranged on a first end of the two-level power converter and the first AC leg output and the second AC leg output are arranged on a second end of the two-level power converter.

Another aspect of the disclosure may be where the at least one high side semiconductor switch and the at least one low side semiconductor switch are each a gallium nitride (GaN) device.

Disclosed herein is a multiphase power inverter assembly. The assembly includes a positive DC power bus and a negative DC power bus laterally offset and overlapping with the negative DC power bus. The assembly also includes a first two-level power converter having a high side semiconductor switch and a low side semiconductor switch with the high side semiconductor switch connected in series with the low side semiconductor switch at a first AC leg node of the first two-level power converter between the positive DC power bus and the negative DC power bus. The assembly also includes a second two-level power converter having a high side semiconductor switch and a low side semiconductor switch with the high side semiconductor switch connected in series with the low side semiconductor switch at a second AC leg node of the second two-level power converter between the positive DC power bus and the negative DC power bus. The assembly also includes a third two-level power converter having a high side semiconductor switch and a low side semiconductor switch with the high side semiconductor switch connected in series with the low side semiconductor switch at a third AC leg node of the third two-level power converter between the positive DC power bus and the negative DC power bus. Furthermore, the positive DC power bus and the high side semiconductor switches in the first, second, and third two-level power converters are laterally offset and overlapping with the negative DC power bus and the low side semiconductor switches of the first, second, and third two-level power converters.

Another aspect of the disclosure may be where the positive DC power bus and the high side semiconductor switches are arranged linearly and the negative DC power bus and the low side semiconductor switches are arranged linearly and parallel to the positive DC power bus and the at least one high side semiconductor.

Another aspect of the disclosure may be where the positive DC power bus and the negative DC power bus are arranged in a coplanar configuration.

Another aspect of the disclosure may be where the positive DC power bus and the negative DC power bus are arranged in a stacked configuration.

Another aspect of the disclosure may be where the positive DC power bus and the negative DC power bus are arranged on a first end of the multiphase power inverter assembly and the first AC leg node, the second AC leg node, and the third AC leg node are arranged on a second end of the multiphase power inverter assembly.

Another aspect of the disclosure may be where the first two-level power converter includes a second high side semiconductor switch and a second low side semiconductor switch with the second high side semiconductor switch connected in series with the second low side semiconductor switch at a fourth phase leg node of the first two-level power converter between the positive DC power bus and the negative DC power bus.

Another aspect of the disclosure may be where the second two-level power converter includes a second high side semiconductor switch and a second low side semiconductor switch with the second high side semiconductor switch connected in series with the second low side semiconductor switch at a fifth phase leg node of the second two-level power converter between the positive DC power bus and the negative DC power bus.

Another aspect of the disclosure may be where the third two-level power converter includes a second high side semiconductor switch and a second low side semiconductor switch with the second high side semiconductor switch connected in series with the second low side semiconductor switch at a sixth phase leg node of the third two-level power converter between the positive DC power bus and the negative DC power bus.

Disclosed herein is a vehicle system. The system includes a DC power source, a positive DC power bus in electrical communication with the DC power source, a negative DC power bus in electrical communication with the DC power source, and a multi-phase power inverter in electrical communication with the positive DC power bus and the negative DC power bus. The multi-phase power inverter includes a first two-level power converter having a high side semiconductor switch and a low side semiconductor switch with the high side semiconductor switch connected in series with the low side semiconductor switch at a first AC leg node of the first two-level power converter between the positive DC power bus and the negative DC power bus. The assembly also includes a second two-level power converter having a high side semiconductor switch and a low side semiconductor switch with the high side semiconductor switch connected in series with the low side semiconductor switch at a second AC leg node of the second two-level power converter between the positive DC power bus and the negative DC power bus. The assembly also includes a third two-level power converter having a high side semiconductor switch and a low side semiconductor switch with the high side semiconductor switch connected in series with the low side semiconductor switch at a third AC leg node of the third two-level power converter between the positive DC power bus and the negative DC power bus. Furthermore, the positive DC power bus and the high side semiconductor switches in the first, second, and third two-level power converters are laterally offset and overlapping with the negative DC power bus and the low side semiconductor switches of the first, second, and third two-level power converters. The vehicle system also includes an electric machine in electrical communication the first AC leg node, the second AC leg node, and the third AC leg node.

Another aspect of the disclosure may be where the positive DC power bus and the high side semiconductor switches are arranged linearly and the negative DC power bus and the low side semiconductor switches are arranged linearly and parallel to the positive DC power bus and the at least one high side semiconductor.

Another aspect of the disclosure may be where the positive DC power bus and the negative DC power bus are arranged in one of a coplanar configuration or a stacked configuration.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

FIG. 3 schematically illustrates an isometric view of a pair of power switches in connection with a DC link capacitor forming a phase leg, in accordance with one aspect of the disclosure.

FIG. 4 schematically illustrates the pair of power switches in connection with the DC link capacitor of FIG. 3.

FIG. 7A schematically illustrates a direction of current flow through a positive bus and direction of flow through a negative bus with the positive and negative buses in a parallel and overlapping configuration, in accordance with one aspect of the disclosure.

FIG. 7B schematically illustrates a direction of current flow through a positive bus and a direction of current flow through a negative bus with the positive and negative buses being in a coplanar and laterally offset configuration, in accordance with one aspect of the disclosure.

FIG. 7C schematically illustrates a direction of current flow through a positive bus and a direction of current flow through a pair of negative buses with the positive and negative buses being in a coplanar and laterally offset configuration, in accordance with one aspect of the disclosure.

FIG. 7D schematically illustrates a direction of current flow through a pair of positive buses and a direction of current flow through a negative bus with the positive and negative buses being in a coplanar and laterally offset configuration, in accordance with one aspect of the disclosure.

FIG. 8A schematically illustrates an isometric view of an example arrangement of elements for a two-level power converter with a two-phase power output.

FIG. 8B schematically illustrates an isometric view of another example arrangement of elements for a two-level power converter with a two-phase power output.

FIG. 8C schematically illustrates an isometric view of yet another example arrangement of elements for a two-level power converter with a two-phase power output.

Figure 1:
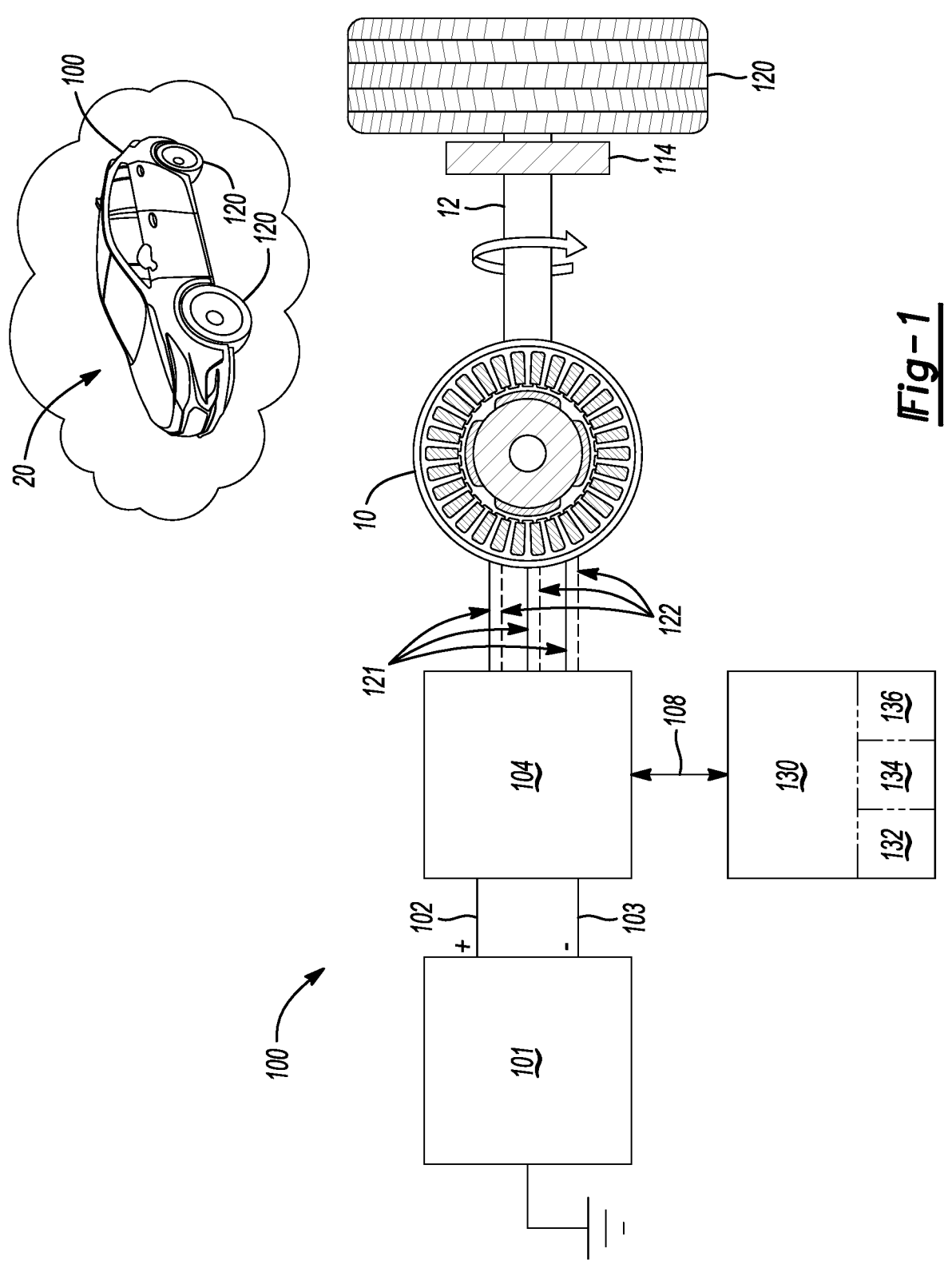
FIG. 1 schematically illustrates an electric drivetrain system including a multi-phase power inverter that is arranged between a high-voltage DC power supply and an electric machine, in accordance with the disclosure.

The appended drawings are not necessarily to scale and may present a somewhat simplified representation of various preferred features of the present disclosure as disclosed herein, including, for example, specific dimensions, orientations, locations, and shapes. Details adjacent to such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments may be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

The present disclosure is susceptible of embodiment in many different forms. Representative examples of the disclosure are shown in the drawings and described herein in detail as non-limiting examples of the disclosed principles. To that end, elements and limitations described herein, but not explicitly set forth in the claims, are not to be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

As used herein, the term "system" refers to mechanical and electrical hardware, software, firmware, electronic control componentry, processing logic, and/or processor device, individually or in combination, including without limitation: application specific integrated circuit (ASIC), an electronic circuit, a processor (shared, dedicated, or group) that executes one or more software or firmware programs, memory device(s) that electrically store software or firmware instructions, a combinatorial logic circuit, and/or other components that provide the described functionality.

As employed herein, terms such as "vertical", "horizontal", "left", "right", "upper", "lower", "top", "bottom" and similar expressions are non-limiting terms that merely describe the various elements as illustrated in the Figures and are not intended to limit the scope of the disclosure.

As used herein, the term "electric machine" refers to an electric motor, generator, or motor-generator device including a rotor and a stator that is capable of converting electric power to mechanical power and/or converting mechanical power to electric power by electromagnetic effort.

This disclosure relates to a system and method of mutual inductance cancellation for a multi-phase power inverter including a plurality of two-level power converters having a topology that reduces parasitic inductance within the multi-phase power inverter. One feature of the reduction in parasitic inductance is a decrease in an amount of voltage overshoot. Voltage overshoot occurs as a temporary increase in voltage that exceeds a desired or steady-stage voltage level during a transition or switching event in the multiphase power inverter.

The concepts disclosed herein relate to a system for a multi-phase power inverter including a plurality of two-level power converters that achieve mutual inductance cancellation. Such a system may be used in a vehicle having an electrified propulsion system, for example, but not limited to, a motor vehicle having an electrified powertrain or propulsion system, e.g., an electric vehicle (EV) or plug-in hybrid vehicle (PHEV), or another mobile platform, which may be powered by an electric propulsion system, to reduce parasitic inductance within the multi-phase power inverter.

Each multi-phase power inverter may include a plurality of two-level power converters arranged between a high-voltage direct current (DC) power supply and an electric machine. The number of two-level power converters required is application specific.

Each two-level power converter is a solid-state integrated circuit (IC) that includes a plurality of circuit components, for example, but not limited to, semiconductor switches, buses, and busbars, which are connected to form a network of interconnections through which current may flow. The form of this network of interconnected circuitry is called a circuit topology. In one example, a bus in this disclosure can include a combination of transistors, DC busbars, power modules, power dies, AC busbars, or capacitors.

The concepts described herein provide a multi-phase power inverter that is advantageously arranged to minimize stray inductance and loop inductance employing magnetic field cancellation. This includes using cancelling fields by arranging the positive bus and the negative bus in laterally overlapping configurations relative to a direction of current flow through the positive and negative buses, such as in a stacked or co-planar configuration. This arrangement of each of the positive and negative buses allows for either single-sided or double-sided cooling to reduce thermal impedance. Resultants of reduced stray inductance may include lower switching loss, less ringing, less electromagnetic interference (EMI), and lower device thermal stress.

Figure 2:
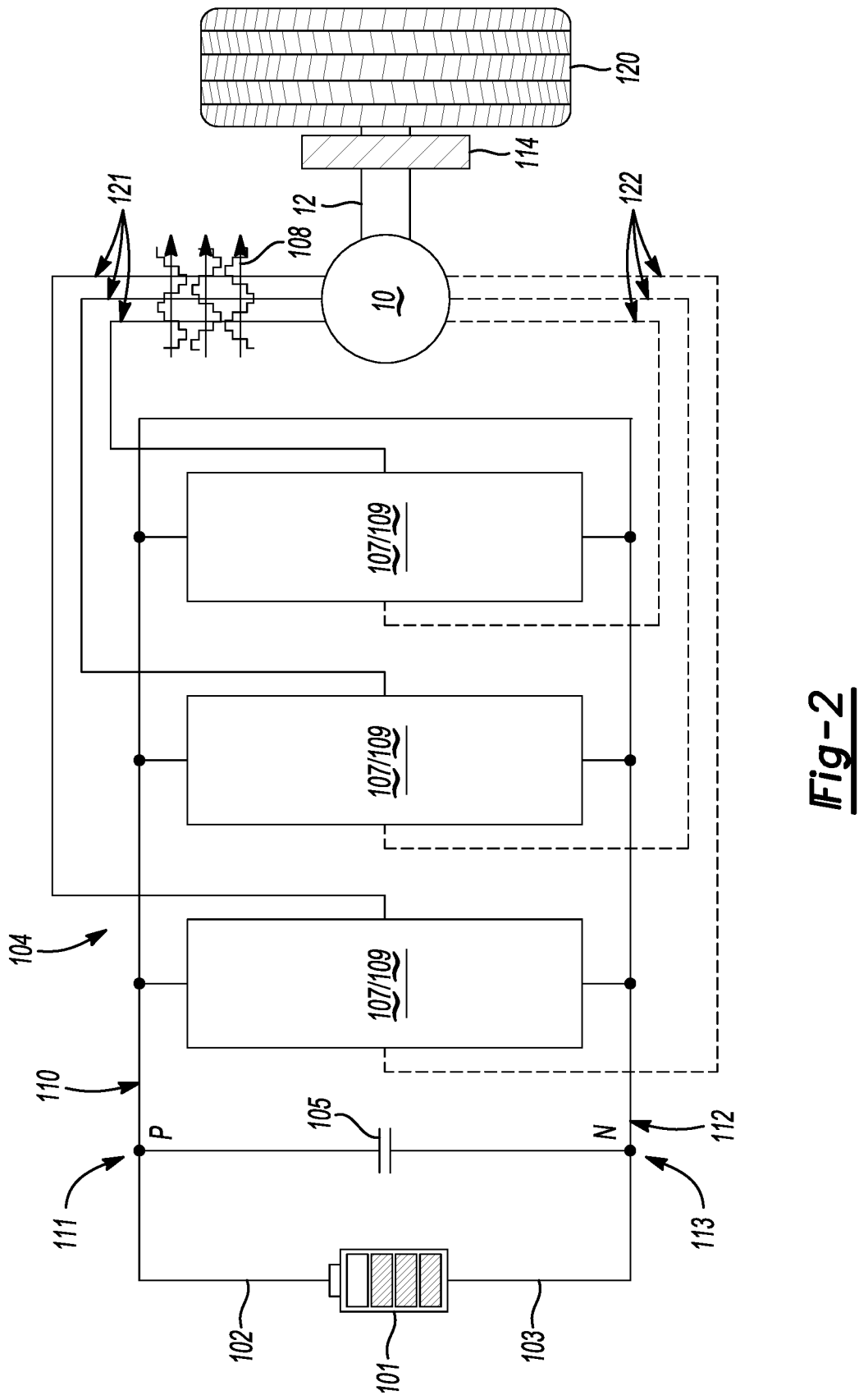
FIG. 2 schematically illustrates an electric drivetrain system including a multi-phase power inverter having a plurality of two-level phase leg pairs that are arranged between a high-voltage DC power supply and an electric machine, in accordance with the disclosure.

Referring to the drawings, wherein like reference numbers refer to the same or like components in the several Figures, FIGS. 1 and 2 schematically illustrate an electric drivetrain 100 that is composed of a high-voltage DC power source 101, a multi-phase power inverter 104, a multi-phase rotary electric motor, generator, or motor-generator (electric machine) 10, and a torque actuator 120, the operations of which are monitored and controlled by a controller 130. In the illustrated example, the multi-phase power inverter 104 can output up to six phases.

According to one aspect of the disclosure, the electric drivetrain 100 is arranged to generate and transfer torque to actuator 120 in the form of one or multiple drive wheels 120 to effect work. Controller 130 executes control routines 136 to control and manage operation of the multi-phase power inverter 104.

The electric drivetrain 100 is disposed on an electrified vehicle, schematically illustrated at 20, and capable of generating tractive torque for vehicle propulsion. When disposed on the electrified vehicle 20, the electrified vehicle 20 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the electric drivetrain 100 may be an element of a stationary system.

The controller 130 may be embodied as one or more digital computing devices and may include one or more processors 134 and memory 132. A control routine 136 may be stored as an executable instruction set in the memory 132 and executed by one of the processors 134 of the controller 130. The controller 130 is in communication with the multi-phase power inverter 104 to control operation thereof in response to execution of the control routine 136 to operate the electric machine 10.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated memory component(s) in the form of transitory and/or non-transitory memory component(s) and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that may be accessed by one or more processors to provide a described functionality. Input/output circuit(s) and devices include analog/digital inverters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables.

The electric machine 10 includes a cylindrically-shaped rotor assembly arranged on a rotor shaft and disposed within an annularly-shaped stator, wherein the rotor assembly is coaxial with a rotor opening that is formed in the stator. Other elements of the electric machine 10, e.g., end caps, shaft bearings, electrical connections, etc., are included but not shown. Electrical windings of the stator are arranged with a quantity of electrical phases and a quantity of electrical turns per phase. Depending on the specific arrangement, the quantity of electrical phases may be between 3 and 6, and the quantity of layers of conductors may be between 4 and 12.

The multi-phase power inverter 104 includes a plurality of semiconductor switches (illustrated with reference to FIG. 2, et seq.) that are arranged and controllable to transform DC electric power to AC electric power, and transform AC electric power to DC electric power, employing a pulse-width modulation signal 108 or another control technique. The multi-phase power inverter 104 is arranged and is controllable to transform DC electric power originating from the high-voltage DC power source 101 to AC electric power to actuate the electric machine 10 via electromagnetic effort. The electric machine 10 is controllable to rotate and generate mechanical torque that is transferred via a rotatable member 12 and a geartrain 114 to the actuator 120 when operating in a torque generating mode. The electric machine 10 is controllable to generate AC electric power from mechanical torque originating at the actuator 120 via electromagnetic effort, which is transformed by the multi-phase power inverter 104 to DC electric power for storage in the high-voltage DC power source 101 when operating in an electric power generating mode.

According to one aspect of the disclosure, the actuator 120 includes a vehicle wheel that transfers torque to a ground surface to effect forward motion as part of a traction propulsion system. The high-voltage DC power source 101 may be in the form of a rechargeable electrochemical battery device, a fuel cell, an ultracapacitor, and/or another electrical energy storage/generation technology.

The high-voltage DC power source 101 may be a rechargeable electrochemical battery device, a fuel cell, an ultracapacitor, and/or another electrical energy storage/generation technology. The high-voltage DC power source 101 connects to the multi-phase power inverter 104 via a high-voltage DC bus having a positive link 102 and a negative link 103, and the multi-phase power inverter 104 connects to the electric machine 10 via a plurality of first AC buses 121 and second AC buses 122 to transfer the pulse-width modulation signal 108.

As illustrated with reference to FIG. 2, the multi-phase power inverter 104 of the electric drivetrain 100 includes three two-level power converters. In one example, the two-level power converters can include two-level single three phase power converter 107 (FIGS. 3-4) for providing three phase power to the electric machine 10 through the first AC bus 121. In another example, the two-level power converter can include two-level dual three-phase power converter 109 (FIG. 6) for providing six phase power to the electric machine through the first and second AC buses 121 and 122. The multi-phase power inverter 104 are arranged between the high-voltage DC power source 101 and the electric machine 10, with a single DC-link capacitor 105 between the high-voltage DC power source 101 and the multi-phase power inverter 104 of the electric drivetrain 100.

According to one aspect of the disclosure, and as described herein, the two-level power converters 107 and 109 employ a mutual inductance cancellation topology. Topology refers to the physical arrangement of the constituent elements, including network busbar interconnects, dielectrics, semiconductor switches, and other elements. With the positive and negative buses both having a parallel direction of current travel with equal and opposite rates of change in the current flow. By arranging the positive and negative buses laterally offset from each other, their self and mutual inductances will cancel each other during transient stages of operation to reduce parasitic losses and overshoot.

The two-level power converters 107 and 109 are arranged as a solid-state integrated circuit (IC) having a plurality of semiconductor switches that are disposed in a stacked or tiered arrangement or a coplanar arrangement as will be discussed in greater detail below.

According to one aspect of the disclosure, at least a portion of the semiconductor switches are field-effect transistors (FETs). According to another aspect of the disclosure, the FETs are gallium nitride (GaN) transistors. According to another aspect of the disclosure, at least a portion of the semiconductor switches are insulated-gate bipolar transistors (IGBTs).

Referring now to FIG. 4, the topology of each of the two-level single three phase power converters 107 (FIG. 3) is arranged as a two-level inverter (TLI) for providing a single phase leg of the three phase power to the electric machine 10. The two levels of the power converters 107 allow for an output at two steady-state voltages to the first AC bus 121 (e.g., 0V and 400V) as opposed to a multi-level power converter which outputs more than two voltages to a corresponding bus. Each of the power converters 107 include two power switches 150 with one of the power switches 150 (high side) connected to the DC-link capacitor 105 through the positive DC power bus 110 and the other power switch 150 (low side) connected to the DC link capacitor 105 through the negative DC power bus 112.

Figures 5A, 5B, 6:
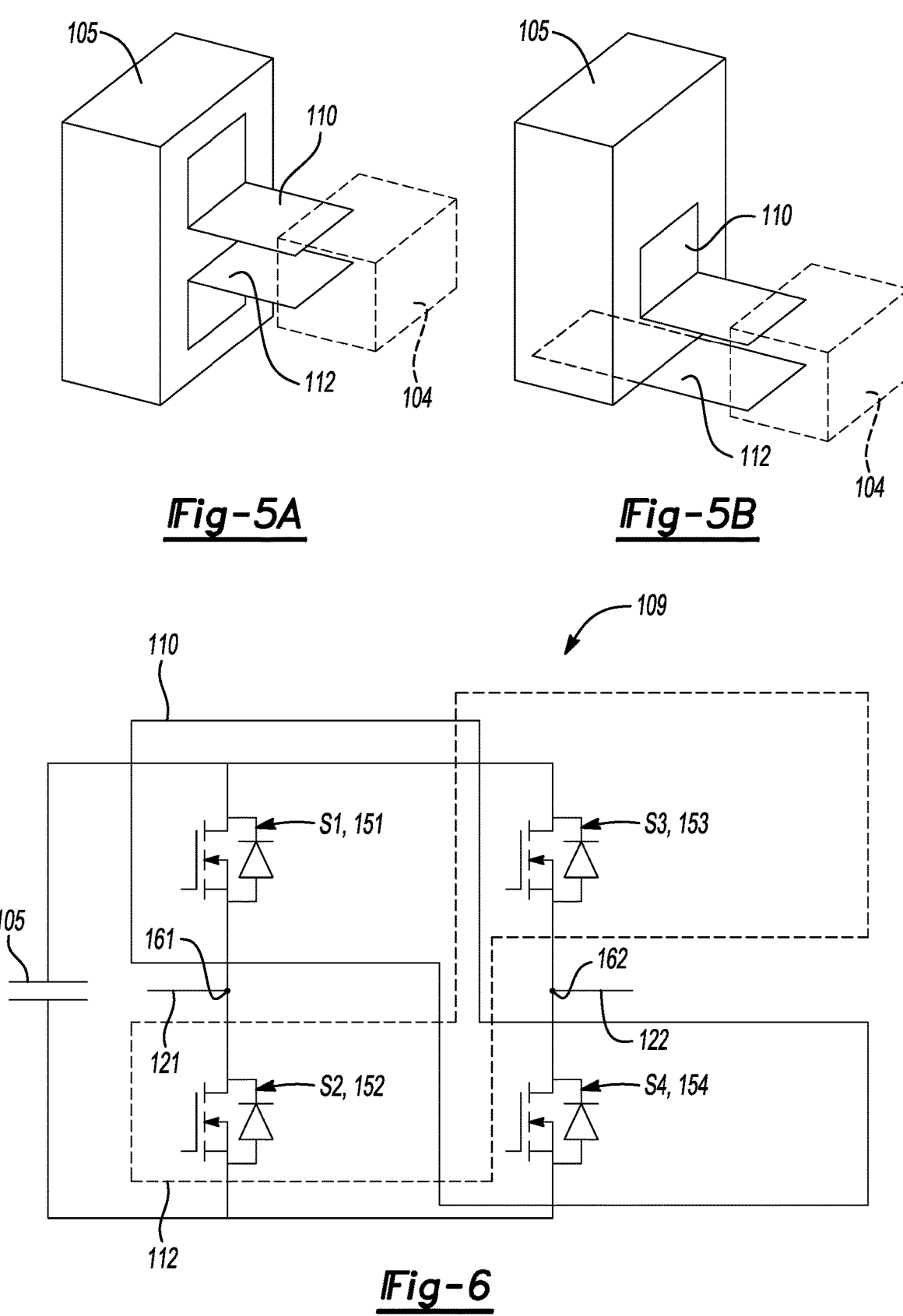
FIG. 5A schematically illustrates an isometric view of an example connection between a DC link capacitor and an inverter.
FIG. 5B schematically illustrates an isometric view of another example connection between a DC link capacitor and an inverter.
FIG. 6 schematically illustrates two pairs of power switches associated with a corresponding phase leg of a two-level converter, in accordance with one aspect of the disclosure.

Furthermore, as shown in FIGS. 5A and 5B, the positive DC power bus 110 and the negative DC power bus 112 can include a number of different connection arrangements to accommodate the inverter 104 with either the power converters 107 or the power converters 109. For example, the positive and negative DC power buses 110, 112 can be connected symmetrically about the DC-link capacitor 105 to the inverter 104 as shown in FIG. 5A. Alternatively, the inverter 104 can be positioned closer to one end of the DC-link capacitor 105 as shown in FIG. 5B.

As illustrated in FIG. 6, the two-level dual three phase power converter 109 includes a first semiconductor switch S1, 151, a second semiconductor switch S2, 152, a third semiconductor switch S3, 153, a fourth semiconductor switch S4, 154, the positive DC power bus 110, the negative DC power bus 112, the first AC bus 121, and the second AC bus 122. The positive DC power bus 110 and a negative DC power bus 112 are schematically illustrated in FIG. 6.

The first semiconductor switch S1, 151 is arranged in series with the second semiconductor switch S2, 152 between the positive DC power bus 110 and the negative DC power bus 112, with the first semiconductor switch S1, 151 being connected to the second semiconductor switch S2 at a first node 161. The first node 161 connects to the first AC bus 121 to transfer three of the six phase legs to the electric machine 10 (shown with reference to FIG. 2).

The third semiconductor switch S3, 153 is arranged in series with the fourth semiconductor switch S4, 154 between the positive DC power bus 110 and the negative DC power bus 112, with the third semiconductor switch S,3 153 being connected to the fourth semiconductor switch S4, 154 at a second node 162. The second node 162 connects to the second AC bus 122 to transfer three additional phase legs to the electric machine 10 for a total of six phase legs (shown with reference to FIG. 2).

FIGS. 7A-7D illustrate arrangements for at least one positive bus 110 and at least one negative bus 112 relative to a direction of positive current flow $I_+$ and negative current flow $I_-$, respectively. In the illustrated example, the positive bus 110 for the power converters 107 and 109 includes the positive DC power bus 110 with the corresponding power switches 150 and associated busbars and capacitors. Similarly, the negative bus 112 for the power converters 107 and 109 includes the negative DC power bus 112 with the corresponding power switches 150 and associated busbars and capacitors.

According to one aspect of the disclosure, as illustrated in FIG. 7A, the positive power bus 110 and the negative bus 112, are arrange, from top 33 to bottom 34, such that the positive bus 110 is parallel to and stacked on the negative bus 112 with the positive and negative currents $I_+$ and $I_-$ being opposite in direction and laterally overlapping. Conversely, as illustrated in FIG. 7B, the positive bus 110 and the negative bus 112 are configured such that the positive bus 110 is coplanar with the negative bus 112 with the positive and negative currents $I_+$ and $I_-$ being opposite in direction and laterally overlapping. Similarly, the positive and negative buses 110 and 112 can be arranged in a coplanar configuration as shown in FIG. 7B, but with multiple negative buses 112 and a single positive bus 110 as shown in FIG. 7C or with multiple positive busses 110 and a single negative bus 112 as shown in FIG. 7D.

One feature of arrangement of the positive and negative buses 110 and 112 of FIGS. 7A-7D, is that magnetic current loops generated by the positive bus 110 and the negative bus 112 overlap with each other resulting in magnetic field cancellation. For example, a first set of current loops encircle the positive bus 110 in a first rotational direction about a direction of current flow $I_+$ through the positive bus 110 and a second set of current loops encircle the negative bus 112 in a second opposite rotational direction about a direction of current flow $I_-$ through the negative bus 112. By overlapping the first and second current loops, magnetic field cancelation occurs and minimizes losses from parasitic inductance that form during the transition between current flowing through each power switch 150 in the two-level converters 107 and 109 while switching.

Even small amounts of parasitic inductance can lead to voltage overshoot while switching in the power converters. This can increase the voltage reaching the electric machine 10. The voltage overshoot occurs because the induced voltage (v) is equal to the inductance (L) in Henries (H) multiplied by a time derivative of the current change (di/dt) while switching as shown in EQ. 1 below.

$$v = L\left(\frac{di}{dt}\right) \qquad \text{EQ. 1}$$

This increase in voltage can be potentially damaging to the operation of the electric machine 10 if it exceeds a predetermined safe operating voltage.

Referring now to FIGS. 8A-8D, according to another aspect of the disclosure, two-level two-phase converters 155, 255, 355, and 455 are illustrated in two-phase inverters.

As illustrated in FIG. 8A, according to another aspect of the disclosure, the two-level two-phase inverter 155, or one phase leg of the two-level dual three-phase inverter 109 is illustrated, and includes a first semiconductor switch S1 151, a second semiconductor switch S2 152, a third semiconductor switch S3 153, a fourth semiconductor switch S4 154, a positive DC power bus 110, a negative DC power bus 112, a first AC bus 121, and a second AC bus 122. It is understood that other elements that have been previously described have been omitted but are included in an aspect of the two-level two-phase inverter 155 when reduced to practice.

The first semiconductor switch S1 151, second semiconductor switch S2 152, third semiconductor switch S3 153, fourth semiconductor switch S4 154, are arranged in a stacked or multi-tiered configuration, including a first (lower) tier 135, and a second (upper) tier 137. The first tier 135 includes the second semiconductor switch S2 152 and the fourth semiconductor switch S4 154, which are coplanar. The second tier 137 includes the first semiconductor switch S1 151 and the third semiconductor switch S3 153, which are coplanar.

The positive DC power bus 110 and the negative DC power bus 112 are located on a first end 158 of the two-level two-phase inverter 155, while the first AC bus 121 and the second AC bus 122 are located on a second end 160 of the two-level converter. The first AC bus 121, the second AC bus 122, the positive DC power bus 110, and the negative DC power bus 112 are connected as illustrated, consistent with the circuit that is illustrated with reference to FIG. 6.

According to this aspect of the disclosure, both the first AC bus 121 and the second AC bus 122 are on the same end, i.e., the second end 160 of the two-level two-phase inverter 155. This configuration facilitates improved electromagnetic coupling, thereby reducing parasitic inductance.

As illustrated in FIG. 8B, according to another aspect of the disclosure, the two-level two-phase inverter 255, or one phase leg of the two-level dual three-phase inverter 109 is illustrated, and includes a first semiconductor switch S1 251, a second semiconductor switch S2 252, a third semiconductor switch S3 253, a fourth semiconductor switch S4 254, a positive DC power bus 210, a negative DC power bus 212, a first AC bus 221, and a second AC bus 222. It is understood that other elements that have been previously described have been omitted but are included in an aspect of the two-level two-phase inverter 255 when reduced to practice.

The first semiconductor switch S1 251, second semiconductor switch S2 252, third semiconductor switch S3 253, fourth semiconductor switch S4 254 are arranged in a stacked or two-tiered configuration, including a first (lower) tier 235 and a second (upper) tier 236. The first tier 235 includes the second semiconductor switch S2 252 and the fourth semiconductor switch S4 254, which are coplanar. The second tier 236 includes the first semiconductor switch S1 251, and the third semiconductor switch S3, 253, which are coplanar.

The positive DC power bus 210 and the negative DC power bus 212 are located on a first end 258 of the two-level two-phase inverter 255, while the first AC bus 221 and the second AC bus 222 are located on a second end 260 of the two-level converter. The first AC bus 221, the second AC bus 222, the positive DC power bus 210, and the negative DC power bus 212 are connected as illustrated, consistent with the circuit that is illustrated with reference to FIG. 6.

According to this aspect of the disclosure, both the first AC bus 221 and the second AC bus 222 extend vertically downward from the switches 251, 252, 253, and 254. This configuration allows direct mount of the two-level two-phase inverter 255 to the electric machine 10, thereby reducing a length of the AC buses 221, 222 between the two-level two phase inverter 255 and the electric machine 10, minimizing voltage overshoot.

As illustrated in FIG. 8C, according to another aspect of the disclosure, the two-level dual-two-phase inverter 355 is illustrated, and includes a pair of first semiconductor switches S1 351, a pair of second semiconductor switches S2 352, a pair of third semiconductor switches S3 353, a pair of fourth semiconductor switches S4 354, a positive DC power bus 310, a negative DC power bus 312, two first AC buses 321A, 321B, and two second AC buses 322A, 322B. It is understood that other elements that have previously described have been omitted but are included in an aspect of the disclosure of the two-level dual-two-phase inverter 355 when reduced to practice.

The first semiconductor switch S1 351, second semiconductor switch S2 352, third semiconductor switch S3 353, and a fourth semiconductor switch S4 354 are arranged in a stacked or multi-tiered configuration, including a first (lower) tier 335, and a second (upper) tier 336.

The first tier 335 includes the second semiconductor switch S2 352, and the fourth semiconductor switch S4 354, which are coplanar. The second tier 336 includes the first semiconductor switch S1 351 and third semiconductor switch S3 353, which are coplanar. The first AC bus 321, the second AC bus 322, the positive DC power bus 310, and the negative DC power bus 312 are connected as illustrated, consistent with the arrangement of the circuit that is illustrated with reference to FIG. 6.

According to this aspect of the disclosure, the positive DC power bus 310 and the negative DC power bus 312 are located on a first end 358 of the two-level dual-two-phase inverter 355, while the two first AC buses 321A, 321B and the two second AC buses 322A, 322B are located on a second end 360 of the two-level dual-two-phase inverter 355.

Each of the positive DC power bus 310 and the negative DC power bus 312 extend a width of two semiconductor switches S2 352, S4, 354 and S1 351, S3 353, respectively, of the two-level dual-two-phase inverter 355. This configuration provides wider paralleling of the positive DC power bus 310 and the negative DC power bus 312, facilitating current flow, reducing both resistance and parasitic inductance.

Each of the first AC buses 321A, 321B and each of the second AC buses 322A, 322B extend a width of a corresponding one of the semiconductor switch S1 351, S2 352, and S3 353, S4 354 of the two-level dual-two-phase inverter 355. The symmetric topologies of dedicated AC buses at the outputs of each individual power switch reduces the total parasitic inductance, decreasing the voltage overshoot and EMI.

Figure 8D:
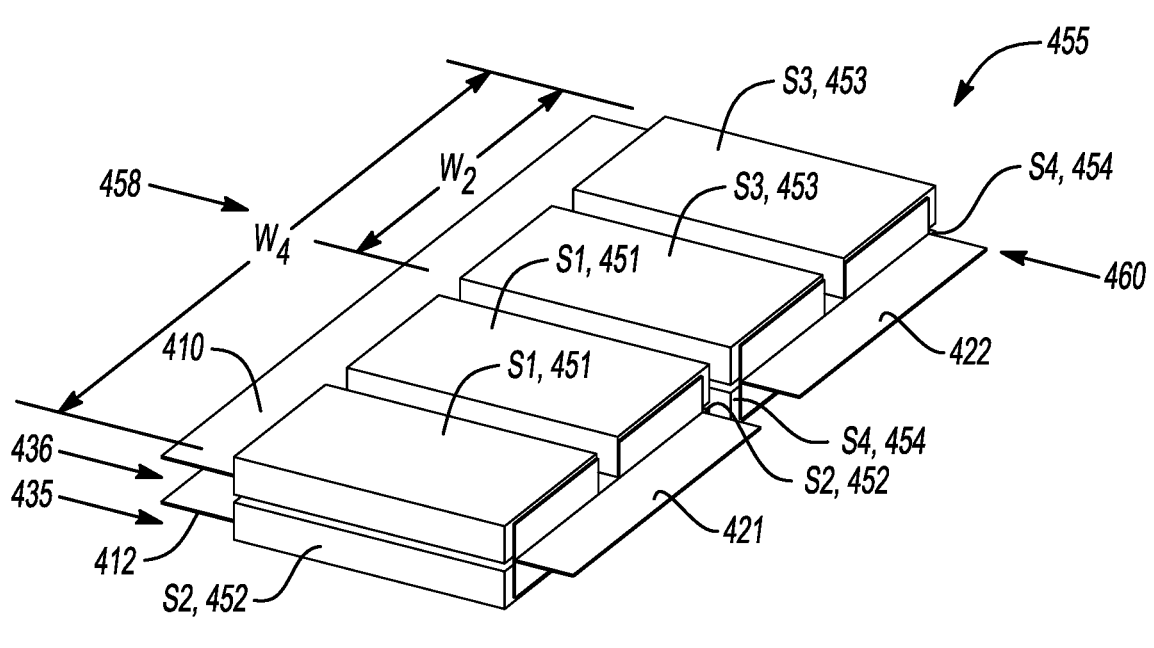
FIG. 8D schematically illustrates an isometric view of a further example arrangement of elements for a two-level power converter with a two-phase power output.

As illustrated in FIG. 8D, according to another aspect of the disclosure, the two-level dual-two-phase inverter 455 is illustrated and includes a pair of first semiconductor switches S1 451, a pair of second semiconductor switches S2 452, a pair of third semiconductor switches S3 453, and a pair of fourth semiconductor switches S4 454, a positive DC power bus 410, a negative DC power bus 412, a first AC bus 421, and a second AC bus 422. It is understood that other elements that have previously described have been omitted but are included in an aspect of the disclosure of the two-level dual-two-phase inverter 455 when reduced to practice.

The first semiconductor switch S1 451, second semiconductor switch S2 452, third semiconductor switch S3 453, and a fourth semiconductor switch S4 454 are arranged in a stacked or multi-tiered configuration, including a first (lower) tier 435, and a second (upper) tier 436.

The first tier 435 includes the second semiconductor switch S2 452, and the fourth semiconductor switch S4 454, which are coplanar. The second tier 436 includes the first semiconductor switch S1 451 and third semiconductor switch S3 453, which are coplanar. The first AC bus 421, the second AC bus 422, the positive DC power bus 410, and the negative DC power bus 412 are connected as illustrated, consistent with the arrangement of the circuit that is illustrated with reference to FIG. 6.

According to this aspect of the disclosure, the positive DC power bus 410 and the negative DC power bus 412 are located on a first end 458 of the two-level dual-two-phase inverter 455, while the first AC bus 421 and the second AC bus 422 are located on a second end 460 of the two-level dual-two-phase inverter 455.

Each of the positive DC power bus 410 and the negative DC power bus 412 extend a width $W_4$ of four coplanar semiconductor switches of the two-level dual-two-phase inverter 455. This configuration provides wider paralleling of the positive DC power bus 410 and the negative DC power bus 412, facilitating current flow, reducing both resistance and parasitic inductance.

Each of the first AC bus 421 and the second AC bus 422 extend a width $W_2$ of two coplanar switches of the two-level dual-two-phase inverter 455. This configuration allows the current to travel through a common connection with the AC BUS 421 and 422.

Figure 9A:
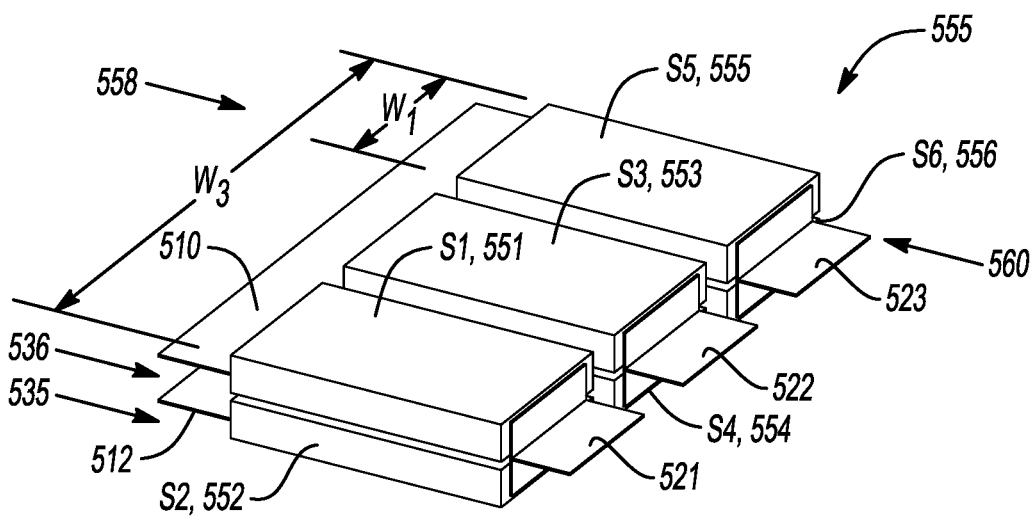
FIG. 9A schematically illustrates an isometric view of an example arrangement of elements for a two-level power converter with a three-phase power output.
Figure 9B:
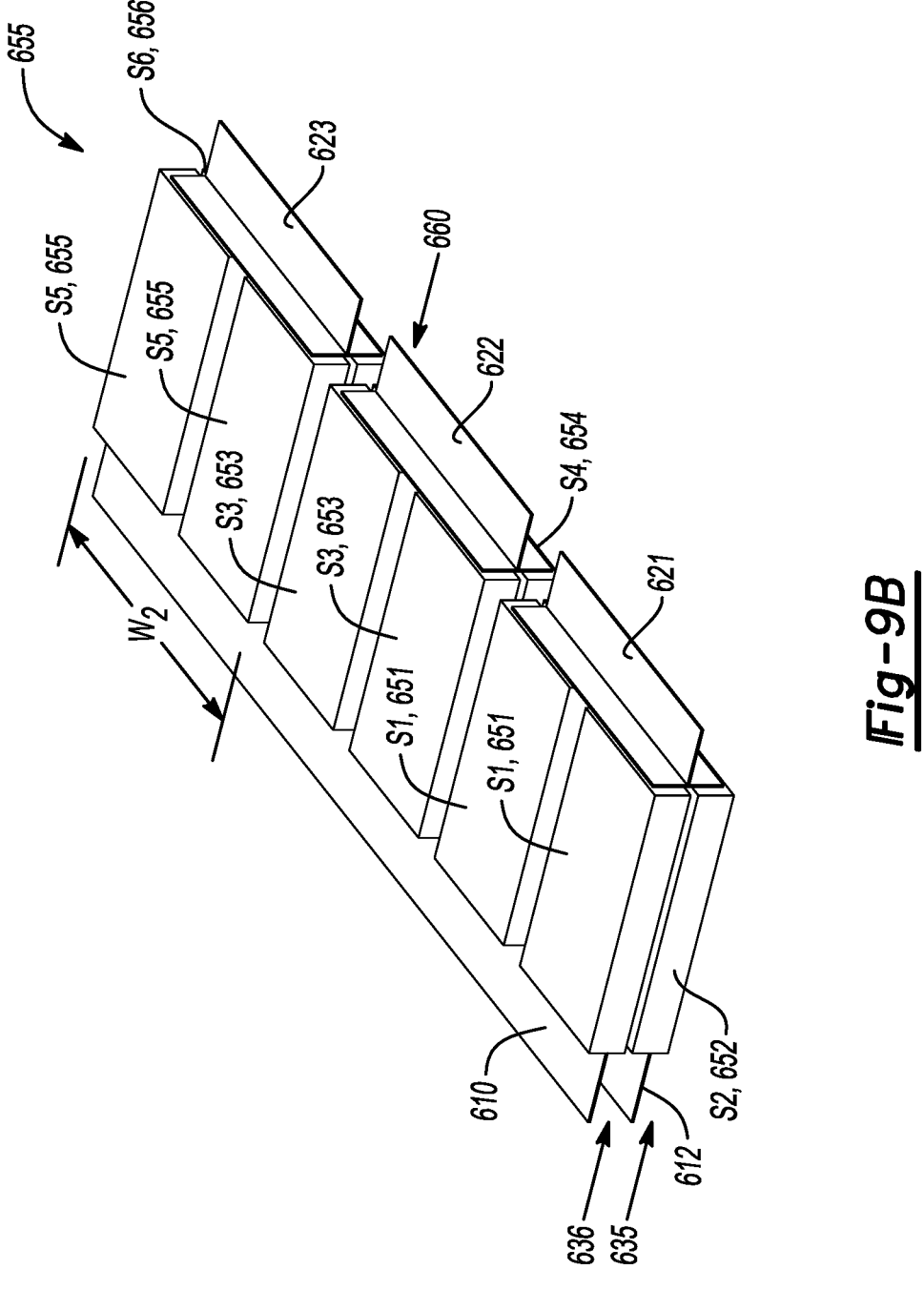
FIG. 9B schematically illustrates an isometric view of another example arrangement of elements for a two-level power converter with a three-phase power output.

Referring now to FIGS. 9A and 9B, according to another aspect of the disclosure, two-level three-phase power inverters 555 and 655 are illustrated in three-phase inverters.

As illustrated in FIG. 9A, the two-level three-phase power inverter 565 is illustrated, and includes a first semiconductor switch S1 551, a second semiconductor switch S2 552, a third semiconductor switch S3 553, a fourth semiconductor switch S4 554, a fifth semiconductor switch S5 555, a sixth semiconductor switch S6 556, a positive DC power bus 510, a negative DC power bus 512, a first AC bus 521, a second AC bus 522, and a third AC bus 523. It is understood that other elements that have previously been described have been omitted but are included in an aspect of the disclosure of the two-level three-phase power inverters 565 when reduced to practice.

The first semiconductor switch S1 551, second semiconductor switch S2 552, third semiconductor switch S3 553, fourth semiconductor switch S4 554, fifth semiconductor switch S5 555, and sixth semiconductor switch S6 556 are arranged in a stacked or multi-tiered configuration, including a first (lower) tier 535, and a second (upper) tier 536. The first tier 535 includes the second semiconductor switch S2 552, the fourth semiconductor switch S4 554, and the sixth semiconductor switch S6 556, which are coplanar. The second tier 536 includes the first semiconductor switch S1 551, the third semiconductor switch S3 553, and the fifth semiconductor switch S5 555 and sixth semiconductor switch S6 556. The first AC bus 521, the second AC bus 522, the third AC power bus 523, the positive DC power bus 510, and the negative DC power bus 512 are connected as illustrated, consistent with the arrangement of the circuit that is illustrated with reference to FIG. 3.

According to this aspect of the disclosure, both the negative DC power bus 512, and the positive DC power bus 510 are located on a first end 558 of the two-level three-phase power inverters 565, while the first AC bus 521, the second AC bus 522, and the third AC bus 523 are located on a second end 560 of the two-level three-phase power inverters 565. Each of the positive DC power bus 510 and the negative DC power bus 512 extend along a width $W_3$ of three semiconductor switches. Each of the first AC bus 521, the second AC bus 522, and the third AC bus 523 extend a width $W_1$ of single semiconductor switches S1 551, S3 553, and S5 555 respectively, of the two-level three-phase power inverters 565. This configuration facilitates current flow, reducing both resistance and parasitic inductance.

As illustrated in FIG. 9B, according to another aspect of the disclosure, the two-level three-phase power inverters 665 is illustrated, and includes a pair of first semiconductor switches S1 651, a pair of second semiconductor switches S2 652, a pair of third semiconductor switches S3 653, a pair of fourth semiconductor switch S4 654, a pair of fifth semiconductor switches S5 655, a pair of sixth semiconductor switches S6 656, a positive DC power bus 610, a negative DC power bus 612, a first AC bus 621, a second AC bus 622, and a third AC bus 623. It is understood that other elements that have previously been described have been omitted but are included in an aspect of the disclosure of the two-level three-phase power inverters 665 when reduced to practice.

The first semiconductor switch S1 651, second semiconductor switch S2 652, third semiconductor switch S3 653, fourth semiconductor switch S4 654, fifth semiconductor switch S5 655, and sixth semiconductor switch S6 656 are arranged in a stacked or multi-tiered configuration, including a first (lower) tier 635, and a second (upper) tier 636. The first tier 635 includes the second semiconductor switch S2 652, the fourth semiconductor switch S4 654, and the sixth semiconductor switch S6 656, which are coplanar. The second tier 636 includes the first semiconductor switch S1 651, the third semiconductor switch S3 653, and the fifth semiconductor switch S5 655, which are coplanar. The first AC bus 621, the second AC bus 622, the third AC power bus 657, the positive DC power bus 610, and the negative DC power bus 612 are connected as illustrated, consistent with the arrangement of the circuit that is illustrated with reference to FIG. 3.

According to this aspect of the disclosure, both the negative DC power bus 612, and the positive DC power bus 610 are located on a first end 658 of the two-level three-phase power inverters 655, while the first AC bus 621, the second AC bus 622, and the third AC bus 623 are located on a second end 660 of the two-level three-phase power inverters 665. Each of the first AC bus 621 and the second AC bus 622 extend a width $W_2$ of two semiconductor switches S1 651, S2 652 and S3 653, S4 654, respectively, of the two-level three-phase power inverters 655. This configuration facilitates current flow, reducing both resistance and parasitic inductance.

Figure 10:
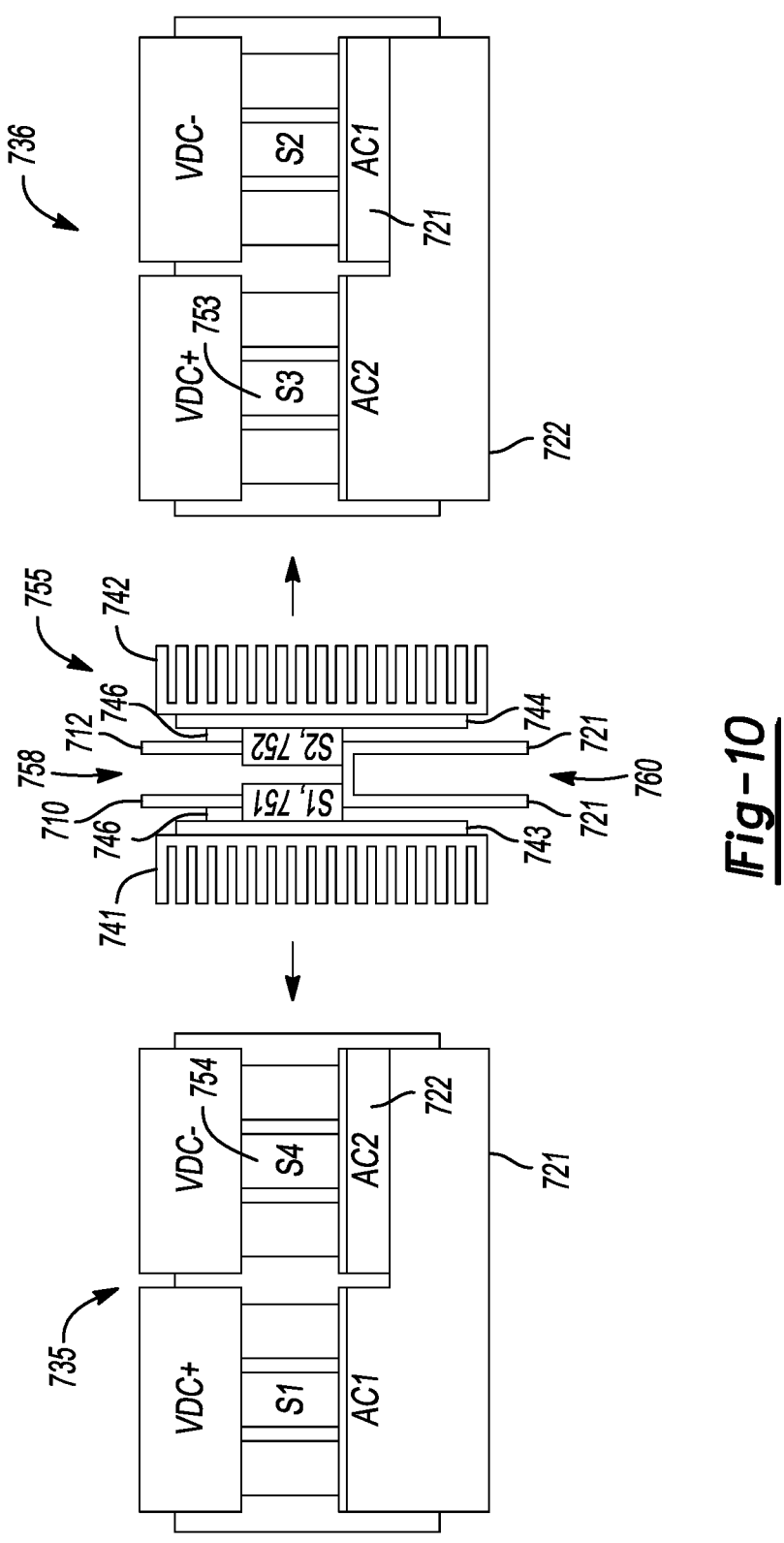
FIG. 10 schematically illustrates a two-level six-phase power inverter.

As illustrated in FIG. 10, according to another aspect of the disclosure, the two-level six-phase power inverter 755 is shown, and includes a first semiconductor switch S1 751, a second semiconductor switch S2 752, a third semiconductor switch S3 753, and a fourth semiconductor switch S4 754, a positive DC power bus 710, a negative DC power bus 712, a first AC bus 721, and a second AC bus 722. It is understood that other elements that have previously been described have been omitted but are included in an aspect of the disclosure of the two-level six-phase power inverter 755 when reduced to practice.

According to one aspect of the present disclosure, each semiconductor switch S1-S4 751-754 includes three power modules PMs arranged parallel to one another. It should be appreciated, however, that each semiconductor switch S1-S4 751-754 may include a number of power modules arranged parallel to one another that is different than the three power modules illustrated, as determined by each application.

The first semiconductor switch S1 751, second semiconductor switch S2 752, third semiconductor switch S3 753, and fourth semiconductor switch S4 754, are arranged in a stacked or multi-tiered configuration, including a first tier 735, and a second tier 736.

The first tier 735 includes the first semiconductor switch S1 751, the fourth semiconductor switch S4 754, the positive DC power bus 710, the first AC bus 721, a first heat sink 741, a first double bonded copper (DBC) plate 743, and conductive spacers 746. The first semiconductor switch S1 751, the fourth semiconductor switch S4 754, the positive DC power bus 710, and the first AC bus 721 are coplanar. The DBC plates can be other power electronics substrates but not limited to, active metal brazed (AMB) substrates, insulated metal substrates (IMS), or their combinations.

The second tier 736 includes the second semiconductor switch S2 752, the third semiconductor switch S3 753, the negative DC power bus 712, and the second AC bus 722, a second heat sink 742, and second DBC plate 744. The first semiconductor switch S1 751, the third semiconductor switch S3 753, the negative DC power bus 712, and the second AC bus 722 are coplanar. The first AC bus 721, the second AC bus 722, the positive DC power bus 710, and the negative DC power bus 712 are connected as illustrated, consistent with the arrangement of the circuit that is illustrated with reference to FIG. 6.

According to this aspect of the disclosure, both the negative DC power bus 712, and the positive DC power bus 710 are located on a first end 758 of the two-level six-phase power inverter 755, while the first AC bus 721 and the second AC bus 722 are located on a second end 760 of the two-level six-phase power inverter 755. Each of the first AC bus 720 and the second AC bus 722 extend a width of two semiconductor switches S1 751, S2 752 and S3 753, S4 754, respectively, of the two-level six-phase power inverter 755. This configuration facilitates the overlapping of the positive and negative DC power buses, the power modules, and the first and second AC buses, reducing both resistance and parasitic inductance.

The illustrated aspects of the disclosure of the two-level power converter provide for overlapping of the positive bus and the negative bus to reduce mutual and self-inductances. This arrangement includes overlaying the first AC bus on the second AC bus to cancel mutual and self-inductances and reduce or eliminate electromagnetic interference and achieve field cancellation via the positive and negative currents to minimize parasitic loop and stray inductances.

This disclosure facilitates optimal design of the positive DC power bus, negative DC power bus, and the DC-link capacitor to achieve mutual inductance cancellation.

This disclosure facilitates various heat transfer and cooling systems, including direct cooling, indirect cooling, immersive cooling, single-sided or double-sided cooling.

This disclosure facilitates a reduction in voltage/current overshoot for device stress, including die/power module, bus bars, and DC-link capacitor.

This disclosure facilitates size reduction and increased power density compared to current systems.

This disclosure facilitates use of lower voltage rating semiconductor switch dies for lower conduction loss and increased EV range compared to current systems.

This disclosure facilitates reduced ringing and radiative/conductive electromagnetic interference to other sub-systems and enables higher switching speed which reduces loss and hence increases vehicle range and current capability.

These and other attendant benefits of the present disclosure will be appreciated by those skilled in the art in view of the foregoing disclosure.

While several topologies are discussed above, they are merely exemplary and non-limiting aspects of the disclosure. Accordingly, it should be appreciated that, within each of the two-level converter 107 and 109, mutual inductance cancellation minimizes parasitic inductance by coupling positive self-inductance and negative mutual inductance for commutation loop currents within each of the two-level converters 107 and 109, i.e., by configuring the topology of the two-level converter 107 and 109 such that the positive DC power bus 110 is parallel with the negative DC power bus 112.

The detailed description and the drawings or figures are supportive and descriptive of the present teachings, but the scope of the present teachings is defined solely by the claims. While some of the best modes and other examples for carrying out the present teachings have been described in detail, various alternative designs and aspects of the disclosure exist for practicing the present teachings defined in the appended claims.

What is claimed is:

1. A two-level power converter assembly, comprising:
   a positive bus including a positive DC power bus, at least one high side semiconductor switch, and an AC bus high side output from the at least one high side semiconductor switch;
   a negative bus including a negative DC power bus, at least one low side semiconductor switch, and an AC bus low side output from the at least one low side semiconductor switch, wherein the positive bus is laterally offset and overlapping with the negative bus and the at least one high side semiconductor switch is connected in series with the at least one low side semiconductor switch between the positive bus and the negative bus; and
   a first node connecting the AC bus high side output to the AC bus low side output, wherein the first node includes a first AC phase leg output.

2. The two-level power converter assembly of claim 1, wherein the positive bus and the negative bus are arranged in a coplanar configuration.

3. The two-level power converter assembly of claim 1, wherein the positive bus and the negative bus are arranged in a stacked configuration.

4. The two-level power converter assembly of claim 1, including a second positive bus coplanar with the positive bus and the negative bus and separated from the positive bus by the negative bus.

5. The two-level power converter assembly of claim 1, including a second negative bus coplanar with the positive bus and the negative bus and separated from the negative bus by the positive bus.

6. The two-level power converter assembly of claim 1, wherein the positive DC power bus and the at least one high side semiconductor switch are arranged linearly and the negative DC power bus and the at least one low side semiconductor switch are arranged linearly and parallel to the positive DC power bus and the at least one high side semiconductor.

7. The two-level power converter assembly of claim 1,
   wherein the at least one high side semiconductor switch includes a first high side semiconductor switch and a second high side semiconductor switch;
   wherein the at least one low side semiconductor switch includes a first low side semiconductor switch and a second low side semiconductor switch;
   wherein the first high side semiconductor switch is connected to the first low side semiconductor switch at the first node with the first high side semiconductor switch and the first low side semiconductor switch connected in series between the positive bus and the negative bus; and
   wherein the second high side semiconductor switch is connected to the second low side semiconductor switch at a second node with the second high side semiconductor switch and the second low side semiconductor switch connected in series between the positive bus and the negative bus.

8. The two-level power converter assembly of claim 7, wherein the second node includes a second AC phase leg output.

9. The two-level power converter assembly of claim 8, wherein the positive bus and the negative bus are arranged in a stacked configuration with the first high side semiconductor switch and the second high side semiconductor switch are arranged in a first tier and the second high side semiconductor switch and the second low side semiconductor switch are located in a second tier.

10. The two-level power converter assembly of claim 8, wherein the positive DC power bus and the negative DC power bus are arranged on a first end of the two-level power converter and the first AC phase leg output and the second AC phase leg output are arranged on a second end of the two-level power converter.

11. The two-level power converter assembly of claim 8, wherein the at least one high side semiconductor switch and the at least one low side semiconductor switch are each a gallium nitride (GaN) device.

12. A multiphase power inverter assembly, comprising:
a positive DC power bus;
a negative DC power bus laterally offset and overlapping with the positive DC power bus;
a first two-level power converter including a high side semiconductor switch and a low side semiconductor switch, wherein the high side semiconductor switch is connected in series with the low side semiconductor switch at a first AC leg node of the first two-level power converter between the positive DC power bus and the negative DC power bus;
a second two-level power converter including a high side semiconductor switch and a low side semiconductor switch, wherein the high side semiconductor switch is connected in series with the low side semiconductor switch at a second AC leg node of the second two-level power converter between the positive DC power bus and the negative DC power bus; and
a third two-level power converter including a high side semiconductor switch and a low side semiconductor switch, wherein the high side semiconductor switch is connected in series with the low side semiconductor switch at a third AC leg node of the third two-level power converter between the positive DC power bus and the negative DC power bus;
wherein the positive DC power bus and the high side semiconductor switches in the first, second, and third two-level power converters are laterally offset and overlapping with the negative DC power bus and the low side semiconductor switches of the first, second, and third two-level power converters.

13. The multiphase power inverter assembly of claim 12, wherein the positive DC power bus and the high side semiconductor switches are arranged linearly and the negative DC power bus and the low side semiconductor switches are arranged linearly and parallel to the positive DC power bus and the high side semiconductor switches.

14. The multiphase power inverter assembly of claim 13, wherein the positive DC power bus and the negative DC power bus are arranged in a coplanar configuration.

15. The multiphase power inverter assembly of claim 14, wherein the positive DC power bus and the negative DC power bus are arranged in a stacked configuration.

16. The multiphase power inverter assembly of claim 13, wherein the positive DC power bus and the negative DC power bus are arranged on a first end of the multiphase power inverter assembly and the first AC leg node, the second AC leg node, and the third AC leg node are arranged on a second end of the multiphase power inverter assembly.

17. The multiphase power inverter assembly of claim 12, wherein:
the first two-level power converter includes a second high side semiconductor switch and a second low side semiconductor switch, wherein the second high side semiconductor switch is connected in series with the second low side semiconductor switch at a fourth phase leg node of the first two-level power converter between the positive DC power bus and the negative DC power bus;
the second two-level power converter includes a second high side semiconductor switch and a second low side semiconductor switch, wherein the second high side semiconductor switch is connected in series with the second low side semiconductor switch at a fifth phase leg node of the second two-level power converter between the positive DC power bus and the negative DC power bus; and
the third two-level power converter includes a second high side semiconductor switch and a second low side semiconductor switch, wherein the second high side semiconductor switch is connected in series with the second low side semiconductor switch at a sixth phase leg node of the third two-level power converter between the positive DC power bus and the negative DC power bus.

18. A vehicle system including:
a DC power source;
a positive DC power bus in electrical communication with the DC power source;
a negative DC power bus in electrical communication with the DC power source;
a multi-phase power inverter in electrical communication with the positive DC power bus and the negative DC power bus, wherein the multi-phase power inverter includes:
a first two-level power converter including a high side semiconductor switch and a low side semiconductor switch, wherein the high side semiconductor switch is connected in series with the low side semiconductor switch at a first AC leg node of the first two-level power converter between the positive DC power bus and the negative DC power bus;
a second two-level power converter including a high side semiconductor switch and a low side semiconductor switch, wherein the high side semiconductor switch is connected in series with the low side semiconductor switch at a second AC leg node of the second two-level power converter between the positive DC power bus and the negative DC power bus; and
a third two-level power converter including a high side semiconductor switch and a low side semiconductor switch, wherein the high side semiconductor switch is connected in series with the low side semiconductor switch at a third AC leg node of the third two-level power converter between the positive DC power bus and the negative DC power bus;
wherein the positive DC power bus and the high side semiconductor switches in the first, second, and third two-level power converters are laterally offset and overlapping with the negative DC power bus and the low side semiconductor switches of the first, second, and third two-level power converters; and
an electric machine in electrical communication the first AC leg node, the second AC leg node, and the third AC leg node.

19. The vehicle system of claim 18, wherein the positive DC power bus and the high side semiconductor switches are arranged linearly and the negative DC power bus and the low side semiconductor switches are arranged linearly and parallel to the positive DC power bus and the high side semiconductor switches.

20. The vehicle system of claim 19, wherein the positive DC power bus and the negative DC power bus are arranged in one of a coplanar configuration or a stacked configuration.

* * * * *